(12) United States Patent
Kostov et al.

(10) Patent No.: US 11,226,244 B2
(45) Date of Patent: Jan. 18, 2022

(54) AUTOMOTIVE EXHAUST GAS SENSOR WITH TWO CALIBRATION PORTIONS

(71) Applicant: Sensata Technologies, Inc., Attleboro, MA (US)

(72) Inventors: Dimitar Kirilov Kostov, Sofia (BG); Vladimir Sabev Shehov, Sofia (BG); Boryana Hristova Todorova, Sofia (BG)

(73) Assignee: Sensata Technologies, Inc., Attleboro, MA (US)

( * ) Notice: Subject to any disclaimer, the term of this patent is extended or adjusted under 35 U.S.C. 154(b) by 294 days.

(21) Appl. No.: 16/426,220

(22) Filed: May 30, 2019

(65) Prior Publication Data

US 2020/0240852 A1  Jul. 30, 2020

Related U.S. Application Data

(60) Provisional application No. 62/798,522, filed on Jan. 30, 2019.

(51) Int. Cl.
| | | |
|---|---|---|
| *G01K 15/00* | (2006.01) | |
| *G01K 7/18* | (2006.01) | |
| *H01C 1/12* | (2006.01) | |
| *H01C 7/00* | (2006.01) | |
| *F01N 11/00* | (2006.01) | |

(Continued)

(52) U.S. Cl.
CPC ............ *G01K 15/005* (2013.01); *F01N 11/00* (2013.01); *G01K 7/183* (2013.01); *G01K 7/223* (2013.01); *G01K 13/02* (2013.01); *H01C 1/12* (2013.01); *H01C 7/00* (2013.01); *F01N 2560/025* (2013.01); *G01K 2205/04* (2013.01)

(58) Field of Classification Search
CPC .......... H01C 1/12; H01C 7/00; G01K 15/005; F01N 11/00
See application file for complete search history.

(56) References Cited

U.S. PATENT DOCUMENTS

| | | | | |
|---|---|---|---|---|
| 4,464,646 A | * | 8/1984 | Burger | G01K 7/183 338/22 R |
| 4,840,494 A | * | 6/1989 | Horn | G01K 7/183 338/195 |

(Continued)

FOREIGN PATENT DOCUMENTS

| | | |
|---|---|---|
| EP | 2801803 | 11/2014 |
| EP | 3396340 | 10/2018 |

OTHER PUBLICATIONS

European search report for European patent application No. 20150701. 9, dated Jun. 26, 2020, 8 pages.

*Primary Examiner* — Kyung S Lee
(74) *Attorney, Agent, or Firm* — Mark H. Whittenberger, Esq.; Holland & Knight LLP

(57) ABSTRACT

A method of manufacturing a sensor include depositing a metal layer on a substrate and fabricating a calibration structure on the metal layer. The calibration structure can include a first calibration portion and a second calibration portion. The method may further include, performing a first calibration of the sensor by modifying the first calibration portion. In addition, the method can include placing a cover layer on a portion of the first calibration portion after the first calibration and then performing a second calibration of the sensor by modifying the second calibration.

18 Claims, 11 Drawing Sheets

(51) Int. Cl.
*G01K 7/22* (2006.01)
*G01K 13/02* (2021.01)

(56) References Cited

U.S. PATENT DOCUMENTS

| | | | |
|---|---|---|---|
| 5,831,512 A | 11/1998 | Wienand et al. | |
| 5,900,135 A * | 5/1999 | Zitzmann | H01C 17/00 |
| | | | 205/717 |
| 6,353,381 B1 | 3/2002 | Dietmann et al. | |
| 6,617,956 B1 | 9/2003 | Zitzmann | |
| 8,305,186 B1 * | 11/2012 | Myers | G01K 15/005 |
| | | | 338/25 |
| 8,333,506 B2 | 12/2012 | Kamenov et al. | |
| 2004/0080394 A1 | 4/2004 | Nelson | |
| 2004/0207507 A1 * | 10/2004 | Landsberger | H01C 17/267 |
| | | | 338/195 |
| 2007/0013474 A1 * | 1/2007 | Cutuli | H01C 3/12 |
| | | | 338/195 |
| 2008/0048823 A1 * | 2/2008 | Ueki | H01C 17/23 |
| | | | 338/195 |
| 2016/0093423 A1 * | 3/2016 | Hozoi | H03L 7/087 |
| | | | 323/369 |
| 2018/0106687 A1 * | 4/2018 | Suzuki | H01C 7/021 |
| 2018/0348062 A1 | 12/2018 | Mitsev et al. | |

* cited by examiner

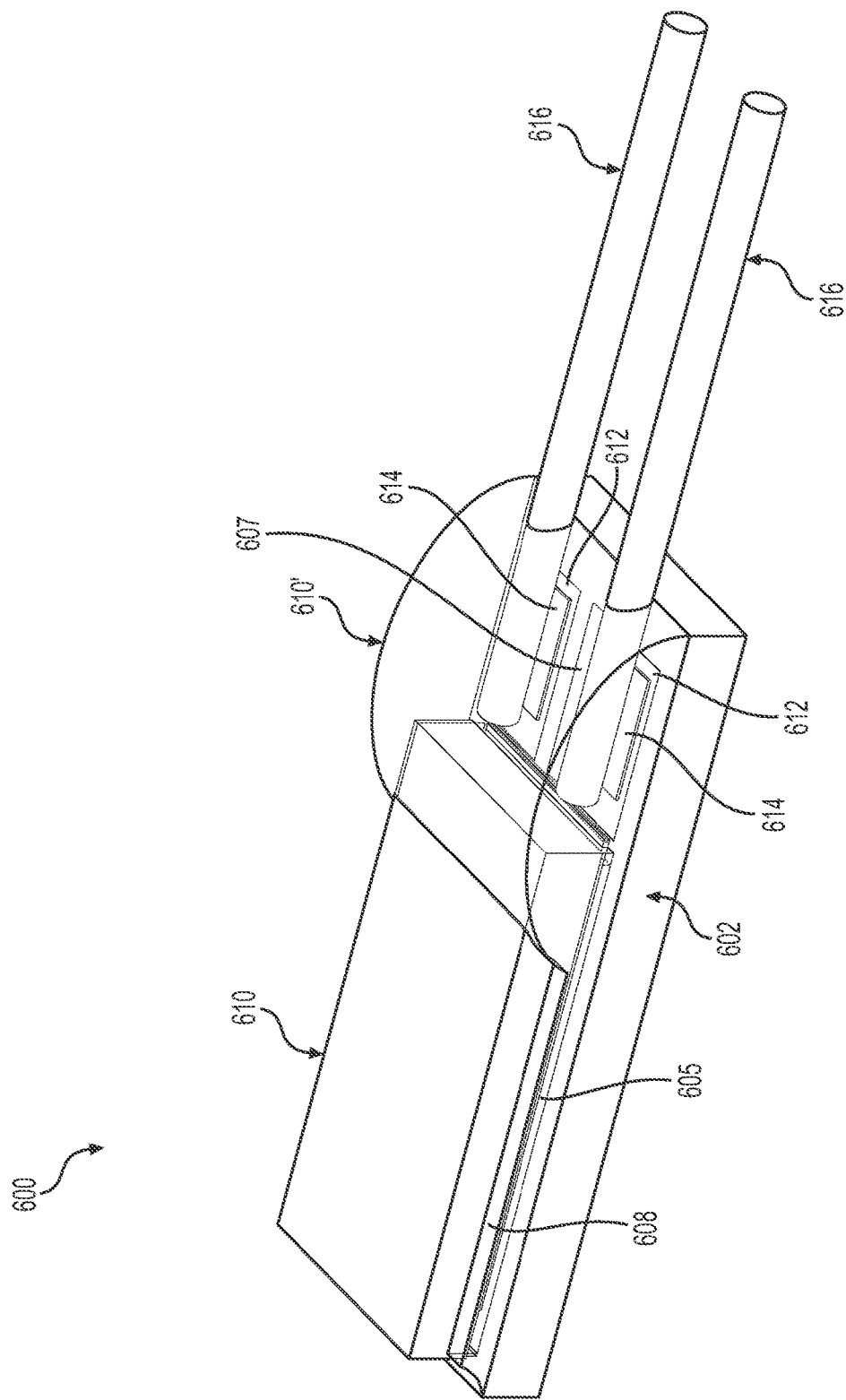

AUTOMOTIVE EXHAUST GAS SENSOR WITH TWO CALIBRATION PORTIONS

RELATED APPLICATIONS

This application claims priority to U.S. Provisional Application No. 62/798,522, entitled "ACCURACY FOR AUTOMOTIVE EXHAUST GAS SENSORS," filed on Jan. 30, 2019, the entire contents of which is hereby incorporated by reference.

FIELD OF THE INVENTION

The disclosure relates to a sensing device with improved accuracy and a method of manufacturing such a sensing device. More particularly, the disclosure relates to an improvement of the accuracy of high-temperature exhaust gas sensors.

BACKGROUND

Internal combustion engines such as, but not limited to, diesel and gasoline engines, may include one or more temperature sensors at least partially disposed within the exhaust system. These temperature sensors sense the temperature of the exhaust gas and may be used by an engine control system to adjust one or more properties of the engine such as air/fuel ratio, boost pressure, timing or the like. These temperature sensors typically operate under thermodynamically and chemically aggressive ambient conditions at temperatures above 600° C.

For the production of high temperature sensors, usually a Platinum resistive layer is applied on a metal oxide ceramic substrate during their production. The calibration of the sensor is realized by adjustment of the Platinum meander resistance and is performed during the production process but before the passivation completion and protective envelope placement. After the completion of the production of the sensor, the Platinum passivation layer(s) and the protective envelopes may include glass and/or ceramic and/or composite layer(s) resulting in a less accurate sensing element.

What is needed is a temperature sensor with improved accuracy.

SUMMARY

According to various embodiments, a method of manufacturing a sensor is provided. The method can include depositing a metal layer on a substrate and fabricating a calibration structure having a first calibration portion and a second calibration portion on the metal layer. The method can further include performing a first calibration of the sensor by modifying the first calibration portion. Further, the method can include placing a cover layer on a portion of the first calibration portion and performing a second calibration of the sensor by modifying the second calibration portion after placing the cover on the first calibration portion.

In some embodiments, modifying the first calibration portion can be performed by modifying a meander structure by removing material. In some embodiments, modifying the second calibration portion can be performed by removing material.

In some embodiments, fabricating the second calibration portion can include fabricating, on the metal layer, at least one of: a structure having a rectangular shape, a structure having a ladder shape, or a structure having a spherical shape.

According to various embodiments, a sensor is provided. The sensor can include a substrate having a calibration structure including a first calibration portion and a second calibration portion. The sensor can further comprise a cover layer in contact with the first calibration portion; wherein at least a portion of the second calibration portion is free of contact with the cover layer and wherein the second calibration portion has been modified subsequent to placement of the cover layer in contact with the first calibration portion.

In some embodiments, the first calibration portion can include a meander structure. In some embodiments, the second calibration portion can include a structure having a rectangular shape, a structure having a ladder shape, or a structure having a spherical shape. In some embodiments, at least one of the first and second calibration portions has been modified by the removal of material. In other embodiments, the first calibration portion can be electrically connected in series with the second calibration portion.

According to various embodiments, a sensor is provided. The sensor can include a substrate, a meander structure provided on the substrate, and a calibration portion provided on the substrate and coupled to the meander portion. The sensor can further include a first cover layer in contact with the meander portion and not in contact with the calibration portion, wherein the calibration portion can be modified subsequent to placement of the first cover layer in contact with the meander portion.

In some embodiments, the calibration portion can be modified by removal of material subsequent to the placement of the first cover layer. In some embodiments, the calibration portion can include at least one of: a structure having a rectangular shape, a structure having a ladder shape, or a structure having a spherical shape. In some embodiments, at least one of the meander portion and the calibration portions can be modified by the removal of material. In some embodiments, the sensor can further include first and second contact pads provided adjacent to one another on the substrate and electrically connected in series with the meander portion and the calibration portion. In some embodiments, the calibration portion can be provided on the substrate between the first and second contact pads. In some embodiments, each of the calibration portion and the meander portion can include a respective amount of resistance for selective reduction, wherein the respective amount of resistance is a function of a respective size, shape, width and thickness.

BRIEF DESCRIPTION OF THE DRAWINGS

Various aspects of at least one embodiment of the present disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the aspects of the disclosure.

FIG. 6D illustrates a sensor design shown in FIG. 6A in accordance with an aspect of the present disclosure;

DETAILED DESCRIPTION

Figure 1:
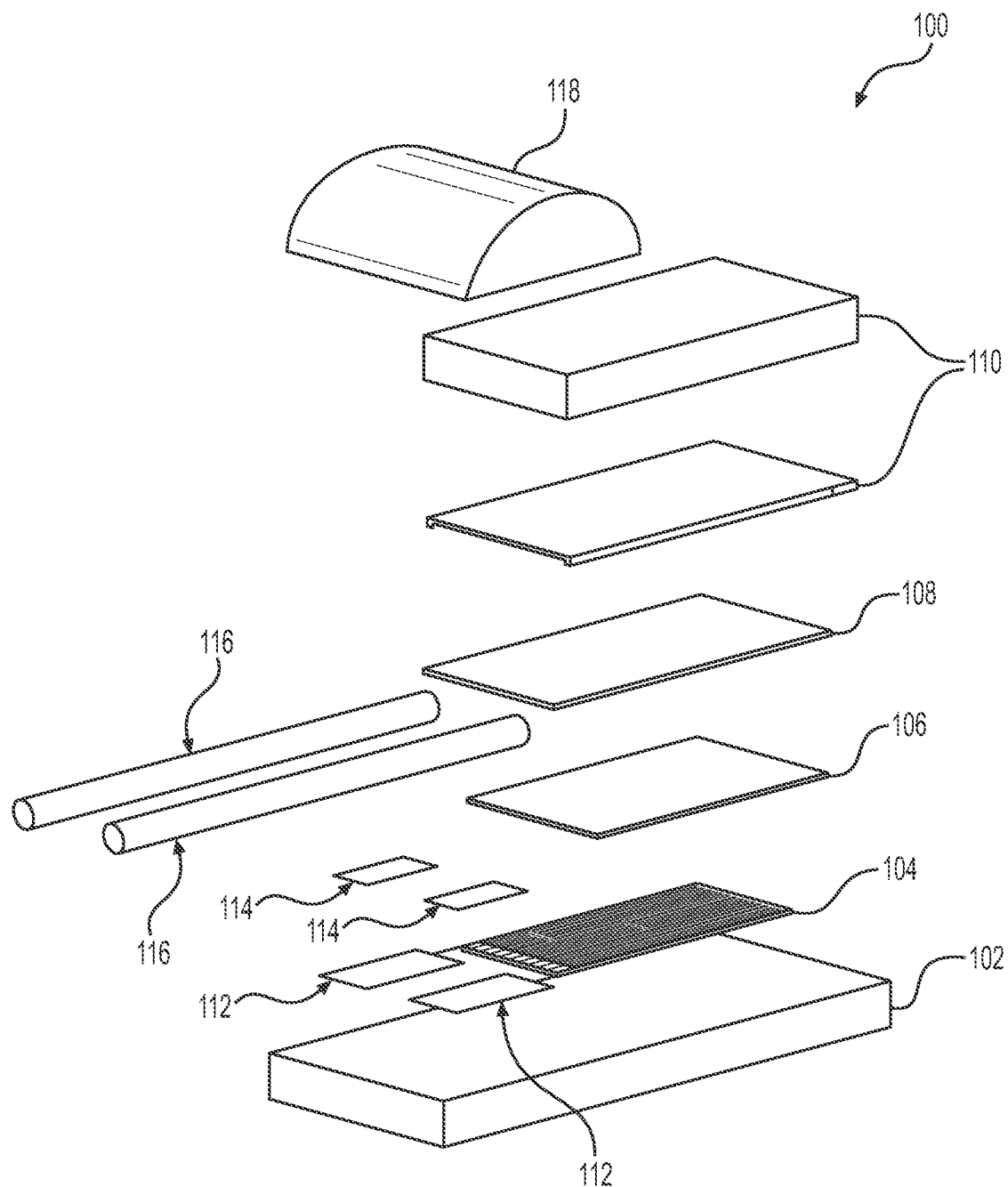
FIG. 1 illustrates a known temperature sensor.

This application claims priority to U.S. Provisional Application No. 62/798,522, entitled "ACCURACY FOR AUTOMOTIVE EXHAUST GAS SENSORS," filed on Jan. 30, 2019, the entire contents of which is hereby incorporated by reference.

In the following detailed description, numerous specific details are set forth in order to provide a thorough understanding of the embodiments of the present disclosure. It will be understood by those of ordinary skill in the art that these embodiments may be practiced without some of these specific details. In other instances, well-known methods, procedures, components and structures may not have been described in detail so as not to obscure the described embodiments.

Prior to explaining at least one embodiment in detail, it is to be understood that these are not limited in their application to the details of construction and the arrangement of the components set forth in the following description or illustrated in the drawings. Also, it is to be understood that the phraseology and terminology employed herein are for the purpose of description only and should not be regarded as limiting.

The present disclosure describes a sensor having a specific design to improve its sensing accuracy. The design allows for an additional calibration step during the manufacturing process, therefore, achieving more accurate sensing results.

The calibration process with an additional calibration zone described in the present disclosure can improve the sensor accuracy at 0 hour (0 h), thus making its performance much better than the known commercial sensors being used in the industry. Further, aspects of the present disclosure reduces the sensor production cost.

For sensors, especially high-temperature sensors, it is desirable to perform fine calibration in order to get accurate sensing results. FIG. 1 illustrates a known temperature sensor 100. During the production of the high temperature sensors, e.g., sensor 100, a substrate 102, e.g., of metal oxide ceramic, is provided with a Platinum meander 104 and contact pads 112 and 114. A first passivation layer 106 is deposited over the Platinum meander 104.

The calibration of the sensor 100 is realized by adjustment of the Platinum meander 104 resistance per known techniques, e.g., laser trimming, before wires 116, a second passivation layer 108, cover layer 110, and a cover layer 118 are positioned on the substrate 102. The cover layer 110 can include two covers, a ceramic cover and a glass cover on top of the ceramic cover. The cover layer 118 can be a glass cover. The metal passivation layer(s) 106, 108, and the cover layer 110 may include glass and/or ceramic and/or composite layer(s).

As is known, the calibration of the sensor is realized by adjusting the resistance of the Platinum meander 104 by increasing the conductor length. The resistance of each sensing element can be adjusted to a nominal value to comply with the desired accuracy specification. The resistance adjustment may be done by laser trimming as explained below.

Figure 2A:
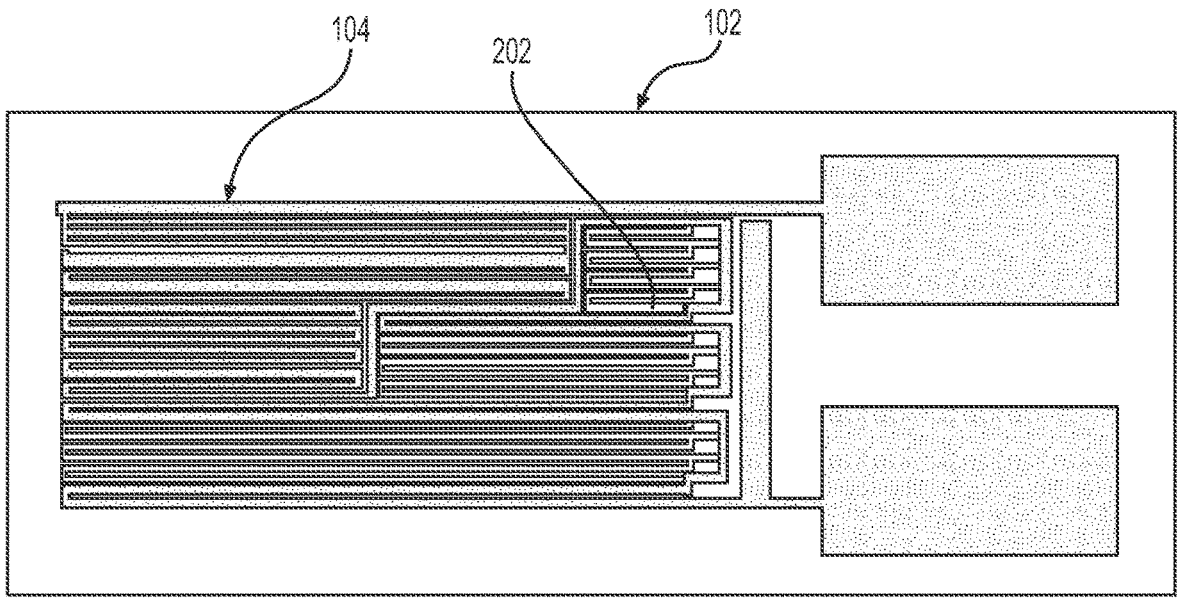
FIGS. 2A and 2B illustrate digital trimming during a calibration process of the temperature sensor of FIG. 1.
Figure 2B:
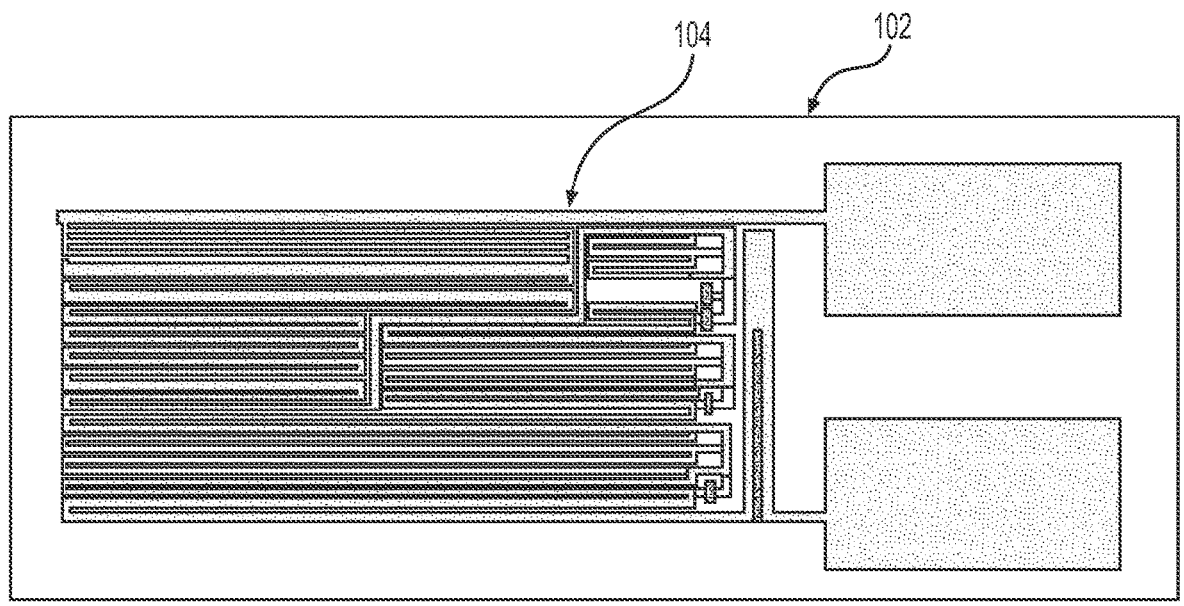

Referring now to FIGS. 2A and 2B, the Platinum meander 104 contains resistance loops with different resistances. The loops are connected in parallel with circuit bridges 202.

The first adjustment is by digital trimming. In digital trimming, the resistance of each sensing element is adjusted to a value close to the nominal +/−3 Ohms by adding resistance loops which increases the Platinum meander 104 length.

FIG. 2B shows that during trimming the laser trimmer cuts connecting bridges 202 and alters a corresponding loop resistance to the total sensing element resistance.

Further, as is also known, analog trimming is a fine calibration process which adjusts the resistance to the nominal value with accuracy around +/−0.1 Ohm. This step is performed after the digital trim by cutting. The laser cutting is performed while measuring the resistance value until the nominal value is reached.

Figure 3:
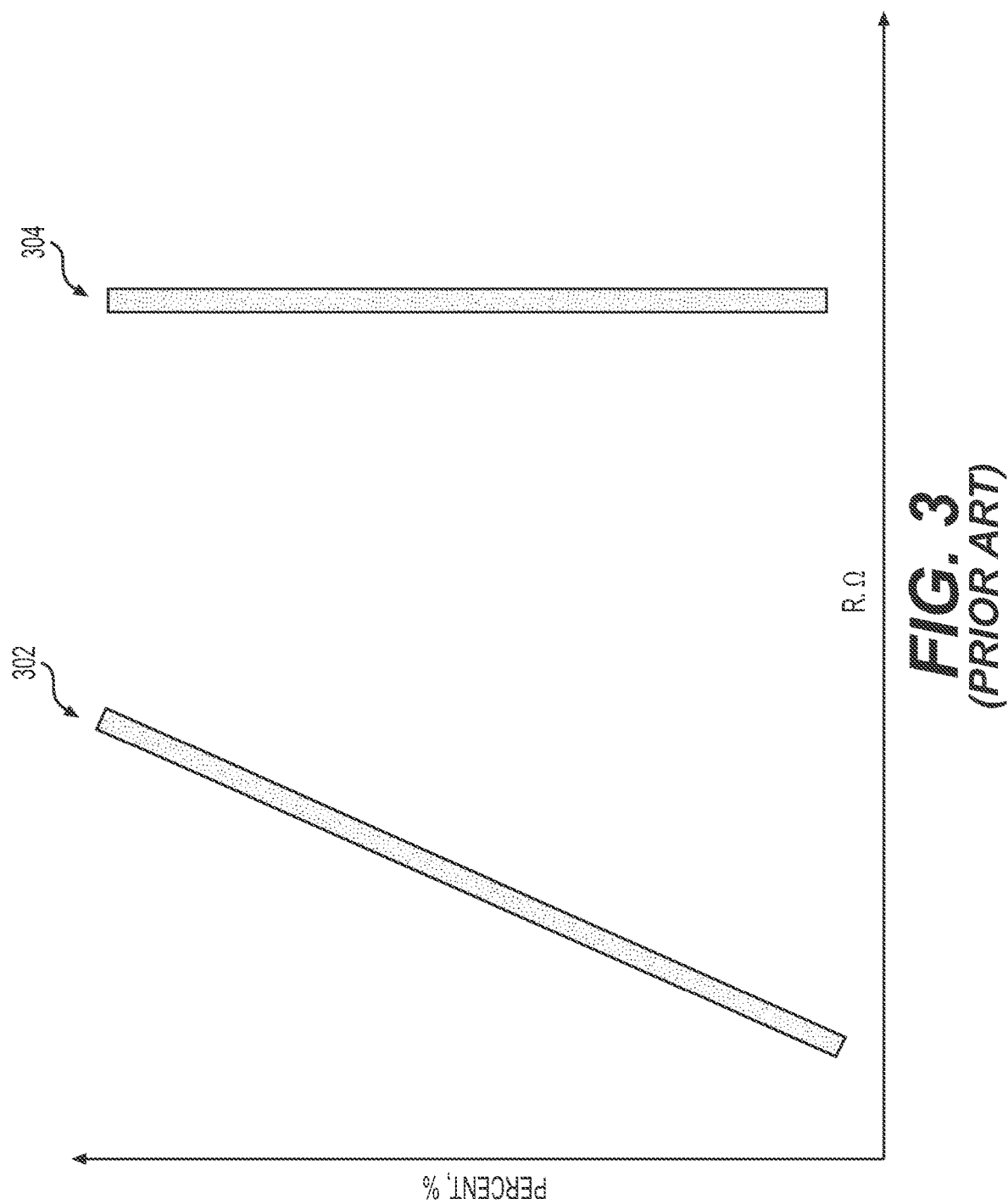
FIG. 3 illustrates the resistance distribution of the temperature sensor of FIG. 1.

FIG. 3 represents a resistance distribution of the known sensor 100, i.e., the Platinum meander 104, before and after calibration. As FIG. 3 illustrates with line 302, the resistance distribution is not uniform before the calibration process. However, the resistance distribution is uniform, per line 304, after the calibration process.

Figure 4:
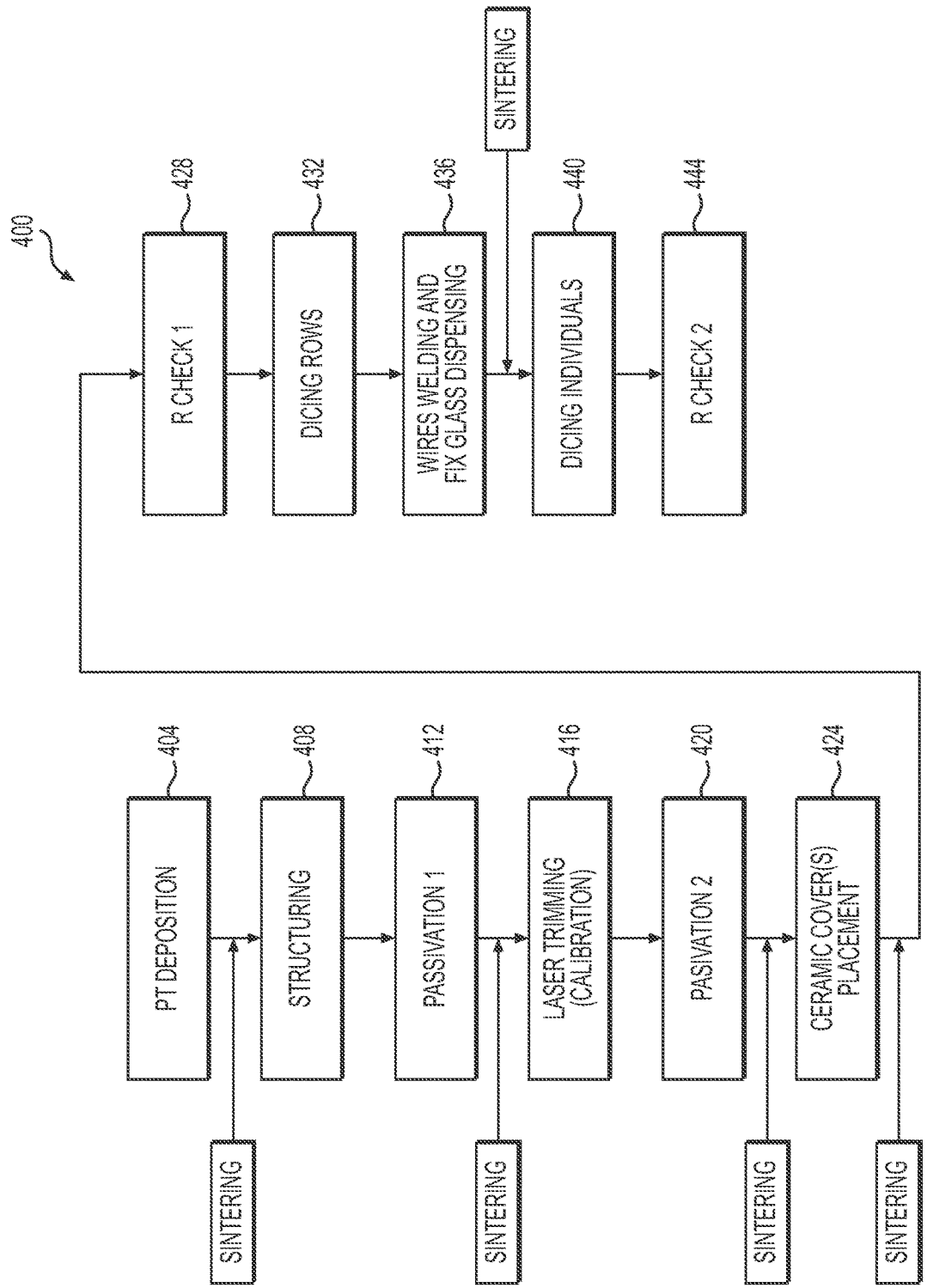
FIG. 4 is a production process of the known sensor in FIG. 1.

As stated above, the calibration of the sensor, e.g., by laser trimming, is implemented during the production process. FIG. 4 illustrates a known method 400 of sensor production with calibration. As FIG. 4 illustrates, for production of a temperature sensor, a Platinum layer is deposited 404 on a substrate and sintered. Then, the sensing element structure is fabricated on the Platinum layer 408 followed by a passivation layer 412 and then sintered. Passivation is a process of depositing a thin film onto the surface of a micro device in order to modify its electrical characteristics.

The next step 416 is the calibration process using laser trimming as described above and which is known to those of ordinary skill in the art. After the sensor is calibrated then a second passivation is performed 420 followed by sintering. In the following step, a ceramic layer is placed 424 on the second passivation layer and then sintered. Subsequently, the resistance of the sensor is measured 428 and then the sensor is diced into rows 432. For production of sensors, it is common to produce multiple sensors on a substrate, e.g., silicon wafer, and then dice the substrate to obtain individual sensors. In dicing process, the substrate is diced into rows and then each row will be diced to obtain a single sensor. The next step of the production is wire welding and attaching or fixing glass dispensing 436 followed by sintering. In the wire welding process, the wires 116 are welded on to the conductive pads 112, 114 and connected to the sensing structure, e.g., meander structure 104, providing electrical connection to the sensing structure. The wires can be metal or metal/ceramic. For example, Platinum, Platinum Rhodium (Pt Rh), Copper, Nickel or any other suitable metal or metal alloy. The next process is depositing glass paste on the welded wires 116 followed by sintering. The glass provides mechanical strength and electrical isolation of the conductive structures. In step 436, a glass can seal, or fix, any welded wires and the second calibration portion 607 to the substrate 602 to make a uniform structure, i.e., the sensor 600. Then the rows will be diced individually 440 and the resistance will be checked for the second time, R check 2, 444.

Figure 5B:
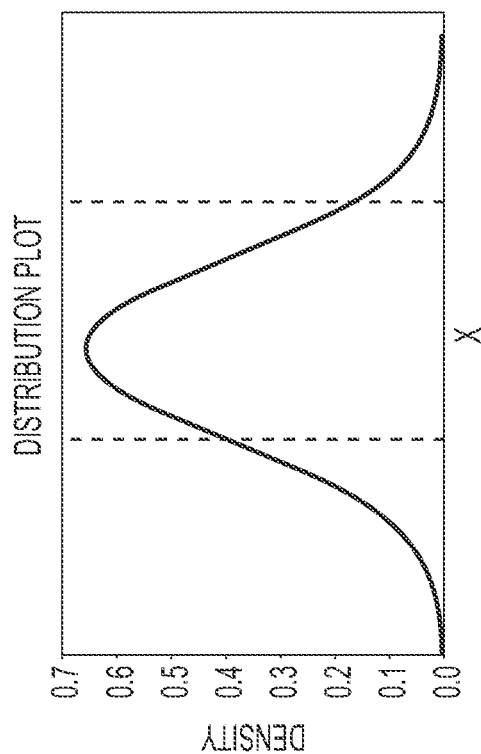
FIGS. 5A and 5B illustrate resistance distribution of the sensor during the production process shown in FIG. 4.
Figure 5A:
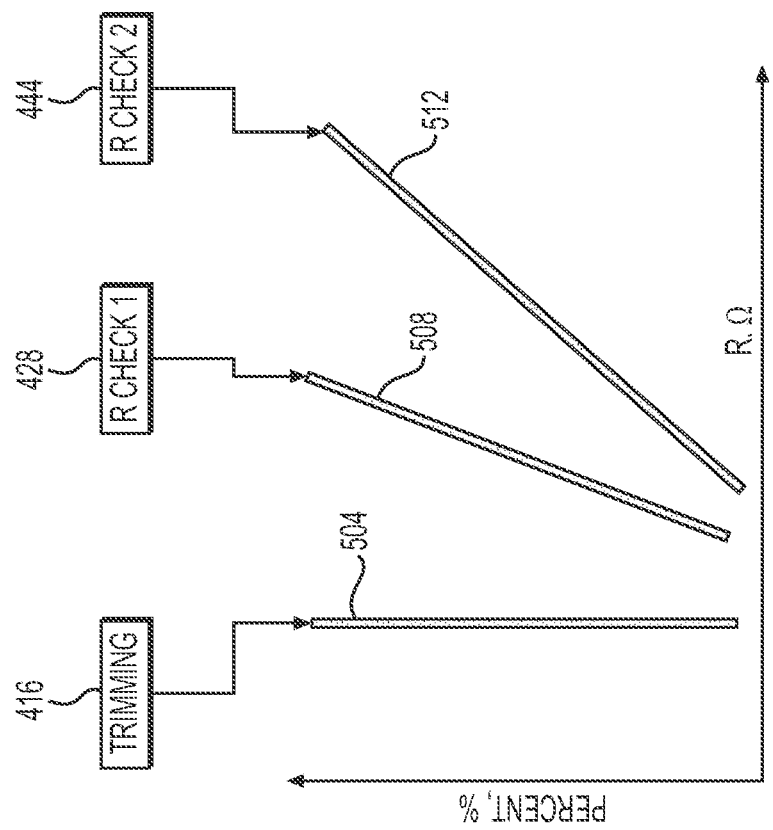

FIGS. 5A and 5B illustrate the changes to resistance distribution of the sensor at various steps of the known production process. As FIG. 5A illustrates, the sensor resistance (R0) distribution 504 at the end of the trimming process 416 is uniform. Subsequently, however, after step 428, the distribution 508 has lost uniformity, and after step 444, the distribution 512 has changed even more. This is due to the high temperature exposures (sintering steps) and coefficient of thermal expansion (CTE) mismatches. FIG. 5B illustrates the resistance distributions measured at steps 428 and 444.

The existing designs on a meander structures including calibration loops do not offer a possibility for mitigating, i.e., correcting for the influence of the sintering processes. The known R0 distribution 512 requires 100% sorting at the chip level in order to meet the customer specification, causing a financial loss.

As explained above, in known sensors, the Platinum meander design allows a calibration only before completion of the passivation layer(s) and placement of the protective or cover layer. Therefore, the negative impact of the sintering processes to resistance distribution is reflected in the sensor accuracy at the end of the manufacturing process.

Advantageously, the present sensor design in accordance with aspects of the present disclosure includes an additional calibration zone in the sensor structure, i.e., an improved meander structure, to achieve this goal.

Figure 6A:
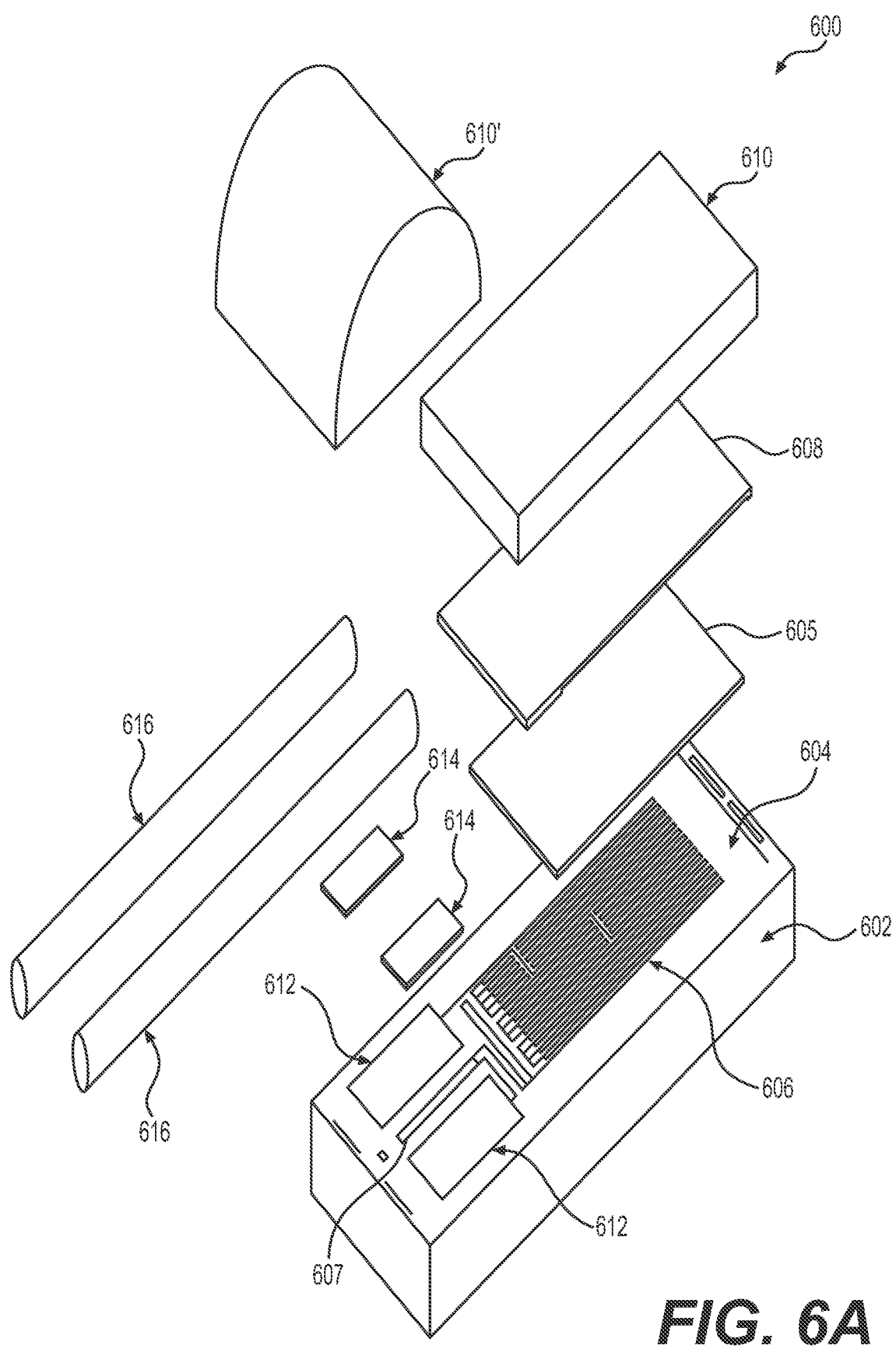
FIG. 6A illustrates a sensor design according to an aspect of the present disclosure.
Figure 6B:
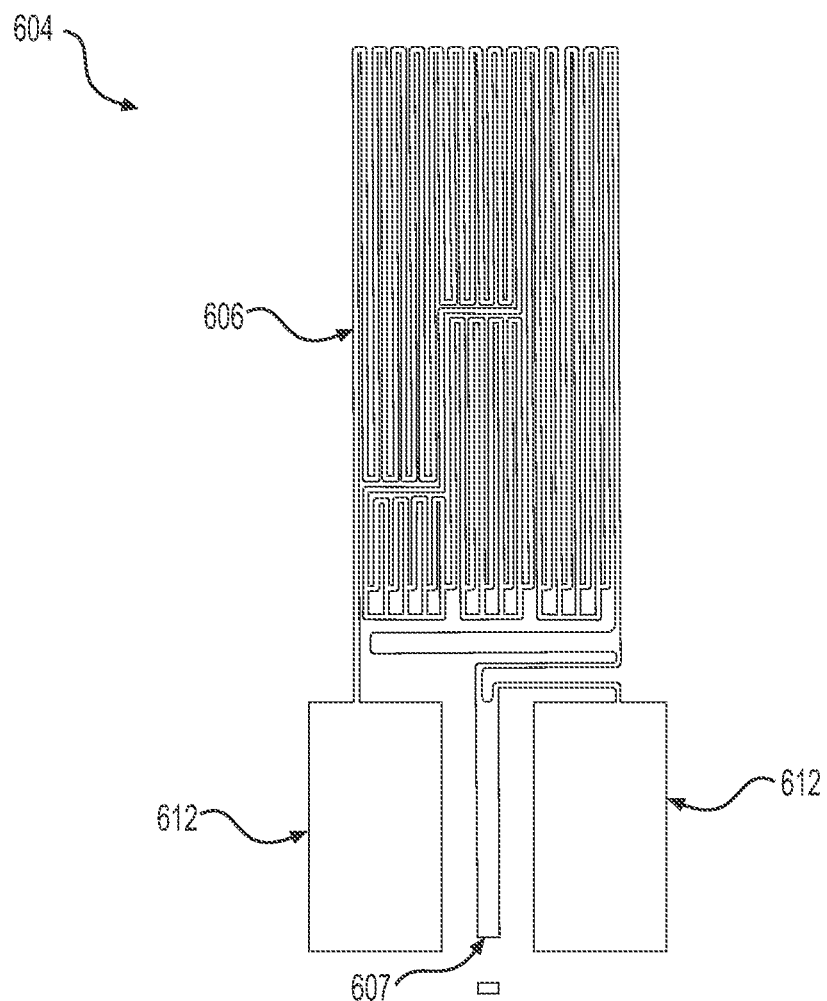
FIG. 6B illustrates a close-up view of the metal structure of the sensor shown in FIG. 6.
Figure 6C:
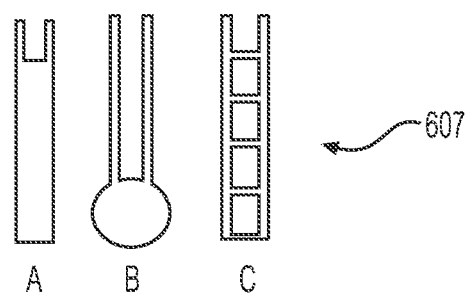
FIG. 6C illustrates a portion of the metal structure shown in FIG. 6B in accordance with an aspect of the present disclosure.

As shown in FIGS. 6A-6C, a sensor design 600 according to aspects of the present disclosure, can include a substrate 602 made of any suitable material, e.g., metal oxide ceramic, alumina oxide ceramic, zirconia oxide ceramic, or a mixture of any of these materials. The sensor 600 can include a calibration structure 604 fabricated on the substrate 602. The calibration structure 604 can be made of any suitable metal, e.g., Platinum, Copper, Nickel, Rhodium, Palladium, or Platinum/Rhodium alloy. The suitable metal or metal alloy can depend on the temperature range and the accuracy of the device and its application. For example, Platinum has a very stable resistance—temperature relationship over the largest temperature range. The calibration structure 604 include a first calibration portion 606 and a second calibration portion 607. As FIGS. 6A-6B illustrate, the first calibration portion 606 can be a meander structure made of, e.g., Platinum. Both, the first calibration portion 606 and the second calibration portion 607 can be the sensing elements of the sensor 600. The sensor 600 can further include wires 616 in contact with contact pads 612. In some embodiments, the sensor 600 can further include contact pads 614 in contact with the wires 616 and the contact pads 612. The sensor 600 can be exposed to the exhaust gas which causes the resistance between the contact pads 612 to change accordingly and the change in resistance is proportional to the temperature of the exhaust gas. In some embodiments, the calibration structure 604, contact pads 612 and 614, and wires 616 are exposed to the exhaust gas.

The sensor 600 can include a first passivation layer 605. The first passivation layer 605 is in contact with the substrate 602 and at least a portion of the calibration structure 604. In some embodiments, the first passivation layer 605 is in contact with the substrate 602 and the first calibration portion 606. In some embodiments, the first passivation layer 605 is in contact with just the first calibration portion 606. In some embodiments, the first passivation layer 605 does not contact the second calibration portion 607. In other embodiments, the first passivation layer 605 contacts only a portion of the second calibration portion 607.

The sensor 600 can further include a second passivation layer 608. In some embodiments the second passivation layer 608 is in contact with the first passivation layer 605. The sensor 600 can further include cover layers 610 and 610'. The cover layers 610 and 610' can be made of any suitable material to protect the sensor 600. For example, the cover layers 610 and 610' can be made of glass, ceramic, or composite materials.

FIG. 6B illustrates a close-up view of the calibration structure 604 according to aspects of the present disclosure. The second calibration portion 607 can be used for a second calibration step in making the sensor. The first calibration portion 604 is electrically connected in series with the second calibration portion 607. As stated above, it is known for sensors to be calibrated once during the production process. Advantageously, the second calibration portion 607 enables a second calibration step of the sensor 600 further down in the production process, as will be described below.

As FIG. 6B illustrates, the calibration structure 604 can be made of the first calibration portion 606, the second calibration portion 607, and contact pads 612. In some embodiments, the calibration structure 604 includes two contact pads 612. In some embodiments, the calibration structure 604 includes at least one contact pad 612. In some embodiments, the first calibration portion 604 the second calibration portion 607, and the contact pads 112 are connected in series. As stated above, the calibration structure 604 can be fabricated on a substrate 602 by depositing a layer of a metal, e.g., Platinum, followed by a fabrication process. In some embodiments, the contact pads 112 are made of a same material as the first calibration portion 606 and the second calibration portion 607. In some embodiments, the contact pad 612 can be a metal, e.g., Platinum.

The second calibration portion 607 can be fabricated and located on any location on the substrate 602 as long as it has electrical contact with the first calibration portion 606. In some embodiments, second calibration portion 607 is located between the contact pads 612. In some embodiments, the second calibration portion 607 is not in contact with the passivation layers 605, 608. In some embodiments, the second calibration portion 607 does not contact the passivation layers 605, 608 and the cover layer 610. In some embodiments, at least a portion of the second calibration portion 607 is not in contact with the passivation layers 605, 608 and/or the cover layer 610. Having at least a portion of the second calibration portion 607 contact free from the passivation layers 605, 608 and/or the cover layer 610, enables the second calibration step further down along in the manufacturing process.

The second calibration portion 607 can be made in any shape. In some embodiments, the second calibration portion 607 has a rectangular shape. FIG. 6C illustrates some embodiments of the second calibration portion 607. For example, the second calibration portion 607 can be made in a rectangle A, round loop B, or ladder design C. Having the second calibration portion 607 in the designs as shown in FIG. 6C, allows the trimmer to cut sections of the second calibration portion 607 to modify the resistance of the sensor 600 into the desired range.

FIG. 6D illustrates the sensor 600 in an assembled arrangement.

Figure 7:
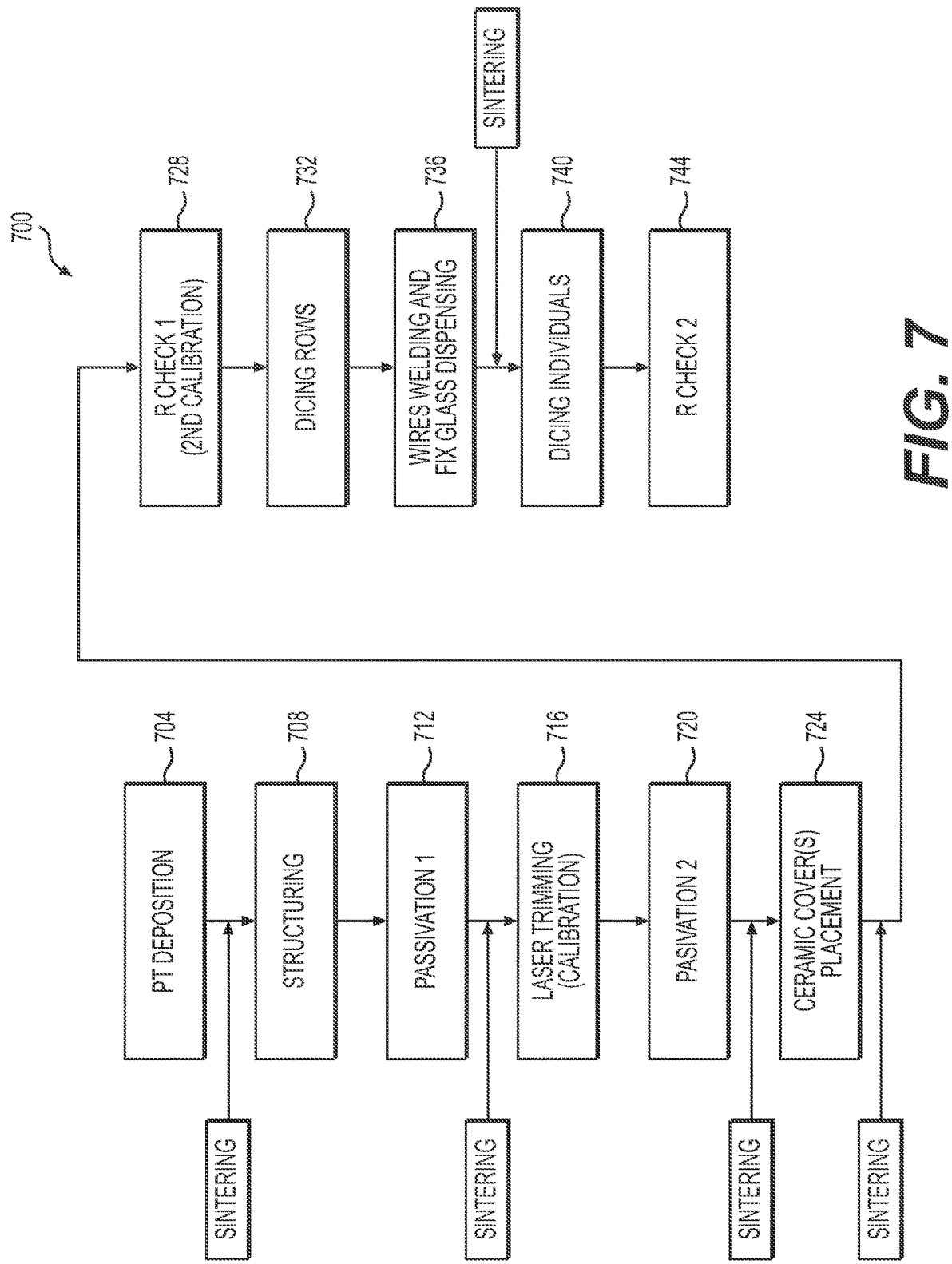
FIG. 7 illustrates a method of manufacturing a sensor according to aspects of the present disclosure.

A process (method) 700 of manufacturing a sensor according to aspects of the present disclosure is presented in FIG. 7. The method 700 can include depositing 704 a metal layer on a substrate and then sintering. The metal can be any suitable metal, e.g., Platinum. Then, the structure, e.g., sensing element, can be fabricated 708 on the metal layer followed by applying 712 a passivation layer 605. The next step can be a sintering step.

The following step can be a first calibrating step 716 of the sensor 600. The calibration can be digital and/or analog calibration as described above. After the sensor 600 is calibrated then the second passivation 720 can be performed and the passivation layer 608 can be sintered. In the following step 724, a cover layer 610 can be placed on the second passivation layer 608 and then sintered. The cover layer 610 can be made of any suitable material, e.g., glass or ceramic. In some embodiments, the method 700 can include placing the cover layer 610 on portions of the substrate 602 and the second passivation layer 608. In some embodiments, the method 700 can include placing the cover layer 610 on portions of the substrate 602, the second passivation layer 608 and at least a portion of the calibration structure 604. At this step 728, the resistance of the sensor 600 (R Check 1) can be measured and the second calibration step can be performed.

The second calibration step can be performed on the second calibration portion 607 of the calibration structure 604 that is not covered by the first passivation layer 605 and/or second passivation layer 608, and/or the cover layer 610. The next step 732 can be dicing the sensor 600 in rows. The next step 736 of the production can be wire welding and attaching or fixing glass followed by sintering. Then the device can be diced individually and the resistance can be checked for the second time 744, R check 2.

As stated above, the second calibration step 728 can be performed as part of the first resistance check, e.g., R check 1. In some embodiments, 2Ω-6Ω of resistance (depends on contour design) can be added to the main structure to compensate the resistance distribution slope. As described above, the method of manufacturing can include two calibration steps in order to reach the nominal value. The nominal value by itself can be chosen depending on the application of the sensor and the desired resistance. In the first calibration step, digital and analog trimming, the resistance value is adjusted to a low value close to the nominal value but not lower than a maximum resistance of the additional contour. For example, adjusting to a nominal value between 195.00Ω-199.00Ω. The second calibration step then can be adjusting all elements to the nominal resistance by modifying the second calibration portion 607, e.g., adjusting to the nominal value of, for example, 200Ω. The amount of resistance to be added can depend on the design of the second calibration portion 607, the width of the first calibration portion 606, a meander width, a thickness of the calibration structure 604, etc. The second calibration portion 607 can be protected by the glass or glass ceramic cover together with the wires fixation step of the production process of FIG. 7.

Figures 8A, 8B:
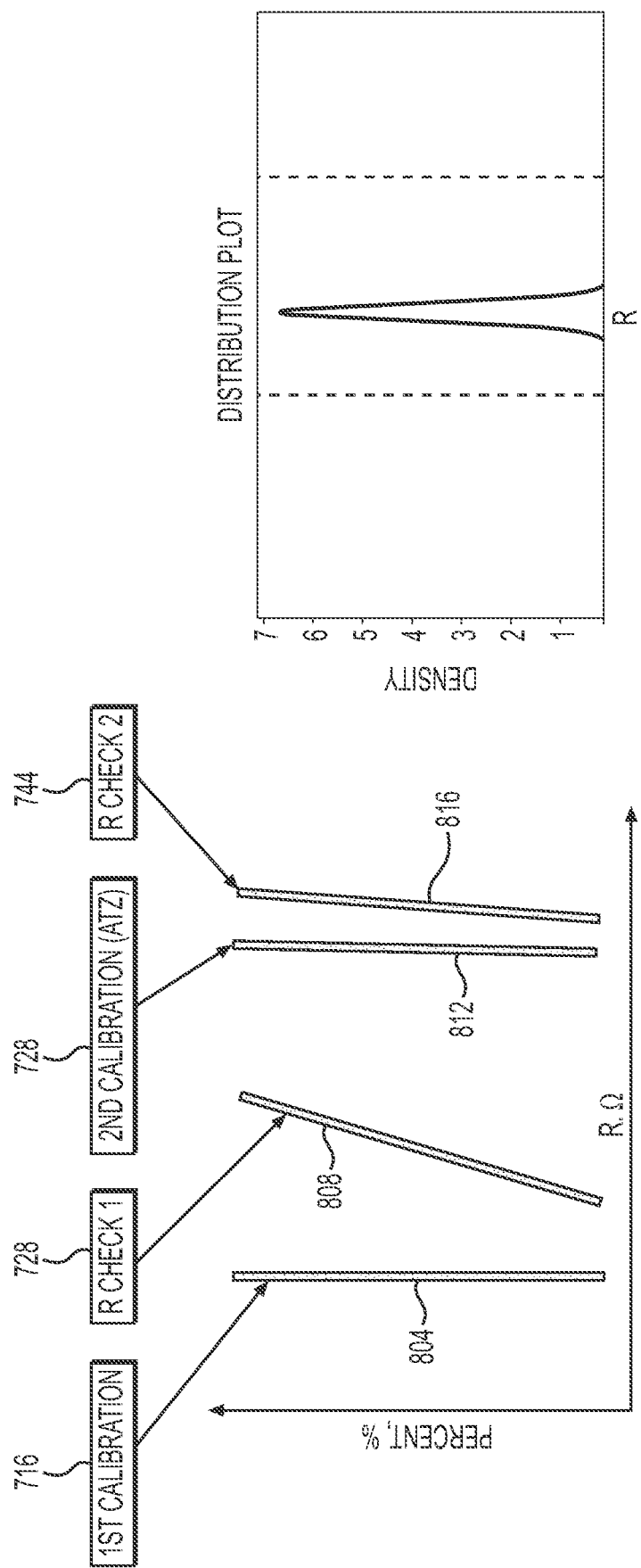
FIGS. 8A-8B are graphs illustrating the resistance of a sensor obtained during the method of manufacturing shown in FIG. 7.

FIGS. 8A and 8B illustrate the resistance distribution of the resulting sensors, per the method 700, at various steps of the production process according to aspects of the present disclosure. As FIG. 8A illustrates, the sensor 600 resistance 804 is relatively constant after the first calibration step 716. The resistance distribution 808 of the sensor 600 changes after the two passivation processes 712, 720 and placement 724 of the cover layer. At the first resistance check 728, R check 1, the sensor 600 is calibrated again, i.e., the second calibration step as shown in 812. As FIG. 8A illustrates, the resistance distribution 816 measured at the end of the process (R check 2) 744 is similar to the resistance 812 measured at the second calibration step 728. FIG. 8B represents a resistance distribution of the sensor 600 after the two step calibrations steps 716, 728.

Figure 9:
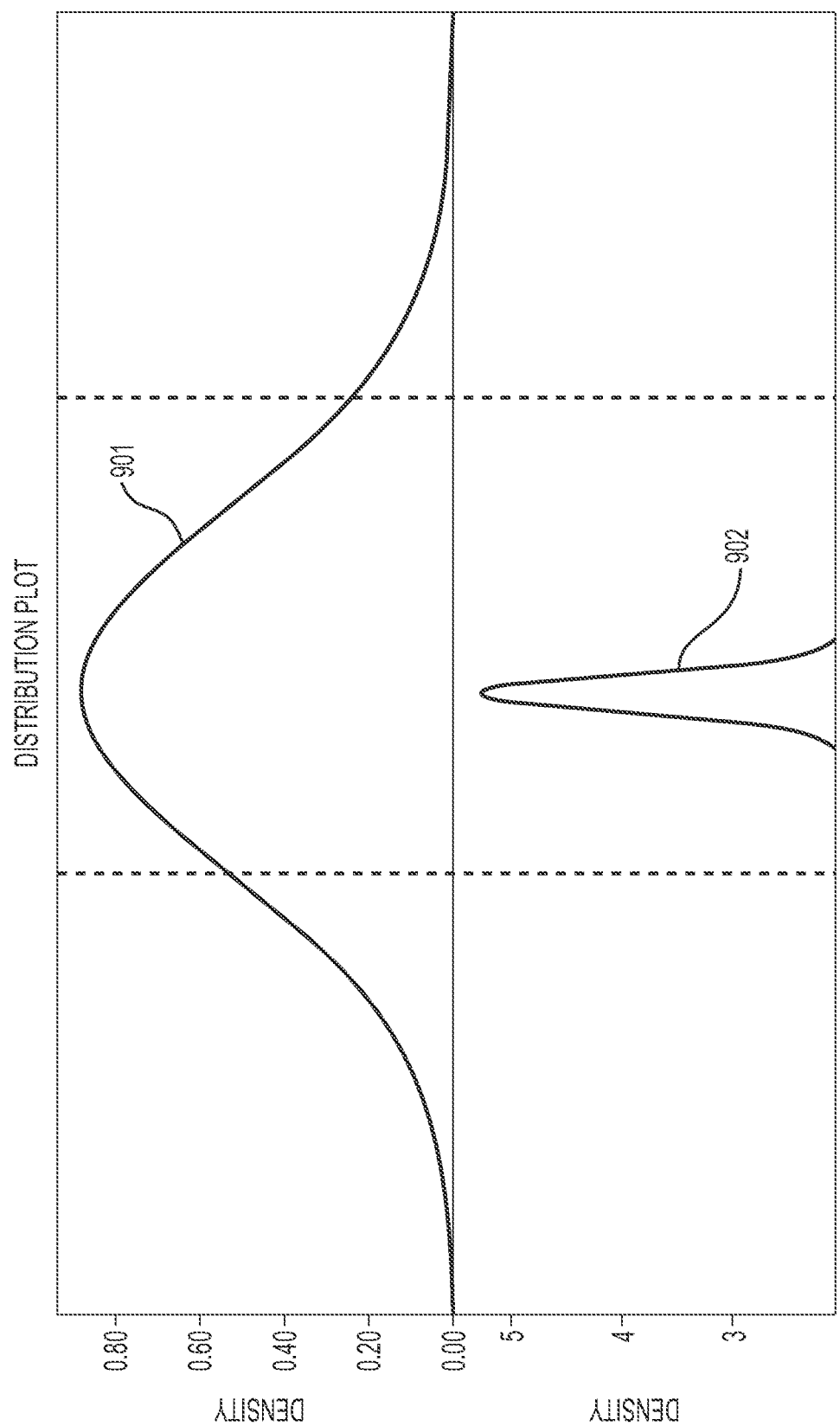
FIG. 9 is a graph illustrating a resistance distribution of sensors according to method of FIG. 7.

FIG. 9 illustrates a comparison of the resistance measurement distribution of the known sensor and the sensor according to aspects of the present disclosure. Plot 901 demonstrates the resistance measurement distribution of the known sensor and plot 902 demonstrates the resistance measurement of the sensor 600 manufactured according to method 700. As FIG. 9 illustrates, the resistance distribution 902 of the sensor 600 is significantly better than that of the known sensor 100.

It is appreciated that while certain features are, for clarity, described in the context of separate embodiments, they may also be provided in combination in a single embodiment. Conversely, various other features, which are, for brevity, described in the context of a single embodiment, may also be provided separately or in any suitable sub-combination.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular embodiments, the present disclosure is not intended to be limited to the particulars disclosed herein; rather, the present disclosure extends to all functionally equivalent structures, methods and uses, such as are within the scope of the claims.

The invention claimed is:

1. A method of manufacturing a sensor, comprising:
   depositing a metal layer on a substrate;
   fabricating a calibration structure having a first calibration portion and a second calibration portion on the metal layer;
   performing a first calibration of the sensor by modifying the first calibration portion;
   placing a cover layer on a portion of the first calibration portion;
   placing at least one passivation layer between the cover layer and the first calibration portion; and
   performing a second calibration of the sensor by modifying the second calibration portion after placing the cover on the portion of the first calibration portion.

2. The method of claim 1, wherein modifying the first calibration portion comprises modifying a meander structure by removing material.

3. The method of claim 1, wherein modifying the second calibration portion comprises removing material.

4. The method of claim 1, wherein fabricating the second calibration portion comprises:
fabricating, on the metal layer, at least one of: a structure having a rectangular shape, a structure having a ladder shape, or a structure having a spherical shape.

5. The method of claim 1, further comprising:
placing a second cover layer on a portion of the second calibration portion.

6. A sensor, comprising:
a substrate having a calibration structure including a first calibration portion and a second calibration portion; and
a cover layer in contact with the first calibration portion,
at least one passivation layer between the cover layer and the first calibration portion
wherein at least a portion of the second calibration portion is free of contact with the cover layer, and
wherein the second calibration portion has been modified subsequent to placement of the cover layer in contact with the first calibration portion.

7. The sensor of claim 6, wherein the first calibration portion comprises a meander structure.

8. The sensor of claim 6, wherein the second calibration portion comprises a structure having a rectangular shape, a structure having a ladder shape, or a structure having a spherical shape.

9. The sensor of claim 6, wherein at least one of the first and second calibration portions has been modified by removal of material.

10. The sensor of claim 6, wherein the first calibration portion is electrically connected in series with the second calibration portion.

11. The sensor of claim 6, further comprising:
a second cover layer in contact with the second calibration portion.

12. A sensor, comprising:
a substrate;
a meander portion provided on the substrate;
a calibration portion provided on the substrate and coupled to the meander portion;
a first cover layer in contact with the meander portion and not in contact with the calibration portion,
wherein the calibration portion has been modified subsequent to placement of the first cover layer in contact with the meander portion; and
at least one passivation layer between the cover layer and the calibration portion.

13. The sensor of claim 12, wherein the calibration portion has been modified by removal of material subsequent to the placement of the first cover layer.

14. The sensor of claim 12, wherein the calibration portion comprises at least one of: a structure having a rectangular shape, a structure having a ladder shape, or a structure having a spherical shape.

15. The sensor of claim 12, wherein at least one of the meander portion and the calibration portions has been modified by removal of material.

16. The sensor of claim 12, further comprising:
first and second contact pads provided adjacent to one another on the substrate and electrically connected in series with the meander portion and the calibration portion,
wherein the calibration portion is provided on the substrate between the first and second contact pads.

17. The sensor of claim 16, wherein each of the calibration portion and the meander portion comprises a respective amount of resistance for selective reduction,
wherein the respective amount of resistance is a function of a respective size, shape, width and thickness.

18. The sensor of claim 12, further comprising:
a second cover layer in contact with a second calibration portion.

* * * * *